Patented Feb. 4, 1941

2,230,565

UNITED STATES PATENT OFFICE 2,230,565

MINERAL CONCENTRATION PROCESS

Peter J. Gaylor, Staten Island, N. Y., assignor to Standard Oil Development Company, a corporation of Delaware No Drawing. Application September 1, 1938, Serial No. 227,960

7 Claims. (Cl. 209—166)

This invention deals with the concentration of mineral ores by the froth flotation method. More specifically, it deals with the employment of certain phenol sulfonates for selectively floating off mineral concentrates from gangue after frothing-up of the ore with an aqueous solution of the phenol sulfonate.

The compounds employed for this purpose may be designated by the following general formula:

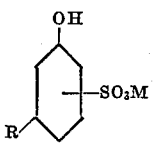

In the formula, R stands for an alkyl radical, and M stands for an alkali metal or alkali metal type group, such as ammonium, onium and the like. One or more alkyl groups may be employed, the position of which is uncertain due to the variation in structure because of changes in operating conditions. It is also uncertain to which carbon the $SO_3M$ group is attached, and this is the reason why the above structure is so indicated.

The groups designated as R may be alkyl groups having 4-22 carbon atoms, and preferably 4-12 carbon atoms. It is preferable that branched chain alkyl groups be employed, since these show superior results over the straight chain compounds. It is also preferred to employ olefin polymer condensation products which are then sulfonated to the desired product. Olefin polymers suitable for this treatment are the lower polymers of ethylene, propylene, butylene, amylene, etc., the dimer and trimer being preferred over other polymers. Other substituents may be added if desired, but the molecule should contain at least one branched chain alkyl group of the type designated above.

These compounds are prepared by treating a mixture of phenol and the desired alkylating olefin with sulfuric acid of about 96% strength, at below 140° F. and preferably at room temperature. The resulting product is then neutralized with caustic or onium base, such as ammonia, dimethyl benzyl ammonium hydroxide, trimethyl sulfonium hydroxide, and the like.

It has been found that these sulfonates possess exceptional frothing ability in hard water and show a higher selectivity than other sulfonates previously employed in the art. The following examples illustrate some of the many phases involved in this invention:

Example 1

A lead-iron ore from the Salt Lake district containing as principal minerals galeno and pyrite, together with minor quantities of sphalerite and the usual silicate minerals, was ground with 0.50 lb. per ton of a sodium phenol sulfonate produced by alkylating phenol with tri-isobutylene and sulfonating with sulfuric acid. An extremely voluminous froth, somewhat mineralized both with galena and pyrite, but mostly galena, was obtained without the addition of other agents.

Example 2

Using no reagent during the grind, a very good lead float was obtained with 0.05 lb. of potassium ethyl xanthate and 0.02 lb. of a sulfonated phenol which had been alkylated with isobutylene trimer.

Example 3

A good iron float (second froth) was obtained with 0.15 lb. of additional xanthate and 0.06 lb. of additional sulfonated phenol which had been alkylated with tri-isobutylene.

A highly suitable olefin for alkylating the phenols employed in this invention is alpha-alpha-gamma-gamma-tetramethyl butylene which is obtained by treatment of isobutylene or isobutyl alcohol with sulfuric acid of about 65% strength. Still other materials suitable for alkylating the phenols employed in this invention are polymers of lower olefins (such as those obtained in refinery gases), obtained by polymerizing such gases with phosphoric acid, boron fluoride, or by plain thermal polymerization at elevated temperature. Still other materials which may be employed for alkylating the phenols are cracked distillates, such as distillates obtained from vapor phase cracked gasoline, cracked wax, copolymers of normal olefins with iso-olefins, such as the co-dimer of normal butylene with isobutylene, and the like. Although multi-nuclear phenols, such as those containing groups such as diphenyl, naphthyl, and the like may be employed, it has been found most desirable to employ mono-nuclear compounds of the type exemplified by phenol.

Other materials such as fuel oil or other hydrocarbons, sludge sulfonates, mahogany sulfonates, and the like, may be used in conjunction with the materials disclosed in this application.

This application is a continuation in part of application 140,866 filed May 5, 1937.

I claim:

1. A process for concentrating lead-iron mineral ores by the froth flotation process comprising frothing-up of the mineral with a metal phenol sulfonate containing an alkyl group having 4–22 carbon atoms, and floating off the froth concentrate from the gangue.

2. A process according to claim 1 in which the sulfonate contains a branched alkyl group.

3. A process according to claim 1 in which the sulfonate contains an alkyl group comprising a polymer of low molecular weight olefins.

4. A process according to claim 1 in which the alkyl group contains 4–12 carbon atoms.

5. A process according to claim 1 in which the sulfonate is an alkali metal alpha-alpha-gamma-gamma-tetramethyl butyl phenol sulfonate.

6. A process according to claim 1 in which the sulfonate contains an alkyl group comprising isobutylene trimer.

7. A process according to claim 1 in which a small amount of xanthate is added to the organic compound used for frothing.

PETER J. GAYLOR.